(12) United States Patent
Gerraty

(10) Patent No.: US 7,865,578 B1
(45) Date of Patent: Jan. 4, 2011

(54) GENERATION OF A CONFIGURATION PATCH FOR NETWORK DEVICES

(75) Inventor: Simon J. Gerraty, Sunnyvale, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 645 days.

(21) Appl. No.: 11/561,748

(22) Filed: Nov. 20, 2006

Related U.S. Application Data

(63) Continuation-in-part of application No. 10/392,201, filed on Mar. 17, 2003, and a continuation-in-part of application No. 10/339,719, filed on Jan. 9, 2003, now Pat. No. 7,483,965, and a continuation-in-part of application No. 10/223,813, filed on Aug. 19, 2002, now Pat. No. 7,233,975.

(60) Provisional application No. 60/446,286, filed on Feb. 6, 2003.

(51) Int. Cl.
G06F 15/177 (2006.01)
G06F 9/00 (2006.01)
G06F 9/44 (2006.01)

(52) U.S. Cl. ............................ 709/220; 713/1; 717/168

(58) Field of Classification Search ......... 709/213–216, 709/220; 713/1; 717/168
See application file for complete search history.

(56) References Cited

U.S. PATENT DOCUMENTS

| | | | |
|---|---|---|---|
| 5,497,316 A | 3/1996 | Sierk et al. | |
| 5,517,646 A | 5/1996 | Piccirillo et al. | |
| 5,600,262 A | 2/1997 | Kolze | |
| 5,835,501 A | 11/1998 | Dalmia et al. | |
| 5,835,601 A | 11/1998 | Shimbo et al. | |
| 5,887,151 A * | 3/1999 | Raz et al. | 712/206 |
| 6,003,075 A | 12/1999 | Arendt et al. | |
| 6,014,669 A | 1/2000 | Slaughter et al. | |
| 6,141,759 A | 10/2000 | Braddy | |
| 6,240,414 B1 | 5/2001 | Beizer et al. | |
| 6,393,419 B1 * | 5/2002 | Novak et al. | 707/8 |
| 6,480,955 B1 | 11/2002 | DeKoning et al. | |
| 6,526,574 B1 * | 2/2003 | Jones | 717/168 |

(Continued)

OTHER PUBLICATIONS

Office Action dated Mar. 24, 2006 for U.S. Appl. No. 10/223,813, 19 pgs.

(Continued)

*Primary Examiner*—Tonia L Dollinger
*Assistant Examiner*—Steven C Nguyen
(74) *Attorney, Agent, or Firm*—Shumaker & Sieffert, P.A.

(57) ABSTRACT

In general, this disclosure relates to techniques for allowing multiple clients to concurrently configure a network device. More specifically, a management module creates a working copy of an initial data source that stores configuration data for a network device and modifies the working copy to reorder one or more configuration objects in a list in response to configuration commands from a client. Upon receiving a show|compare command or a commit command, the management module generates a configuration patch that is a textual representation of any differences between the working copy and the initial data source. The configuration patch includes modification control indicators that identify configuration objects in the list that are reordered. The patch is applied to the initial data source to reorder the list of configuration objects within the initial data source without processing portions of the configuration data associated with the reordered configuration.

22 Claims, 9 Drawing Sheets

U.S. PATENT DOCUMENTS

| | | | |
|---|---|---|---|
| 6,529,905 B1 | | 3/2003 | Bray et al. |
| 6,587,124 B1 | * | 7/2003 | Slaby .......................... 715/735 |
| 6,671,699 B1 | | 12/2003 | Black et al. |
| 6,901,580 B2 | * | 5/2005 | Iwanojko et al. ............ 717/121 |
| 6,907,603 B2 | | 6/2005 | Scott |
| 6,996,372 B2 | | 2/2006 | Noerpel et al. |
| 6,996,672 B2 | | 2/2006 | Lubbers et al. |
| 7,000,161 B1 | | 2/2006 | Allen et al. |
| 7,039,050 B1 | * | 5/2006 | Mutreja ...................... 370/389 |
| 7,043,537 B1 | | 5/2006 | Pratt |
| 7,055,148 B2 | | 5/2006 | Marsh et al. |
| 7,065,637 B1 | | 6/2006 | Nanja |
| 7,130,870 B1 | | 10/2006 | Pecina et al. |
| 7,233,975 B1 | | 6/2007 | Gerraty et al. |
| 7,290,164 B1 | | 10/2007 | Harvey et al. |
| 7,307,979 B2 | | 12/2007 | Visser |
| 7,457,830 B1 | | 11/2008 | Coulter et al. |
| 2001/0039519 A1 | * | 11/2001 | Richards ...................... 705/27 |
| 2002/0161860 A1 | | 10/2002 | Godlin et al. |
| 2002/0162049 A1 | | 10/2002 | Takamoto et al. |
| 2002/0194015 A1 | | 12/2002 | Gordon et al. |
| 2003/0037040 A1 | | 2/2003 | Beadles et al. |
| 2003/0070063 A1 | | 4/2003 | Boyle et al. |
| 2003/0101059 A1 | * | 5/2003 | Heyman ...................... 704/275 |
| 2003/0121033 A1 | | 6/2003 | Peev et al. |
| 2003/0149755 A1 | * | 8/2003 | Sadot .......................... 709/223 |
| 2003/0212983 A1 | | 11/2003 | Tinker |
| 2003/0225866 A1 | | 12/2003 | Hudson |
| 2004/0032837 A1 | | 2/2004 | Visser |
| 2004/0139179 A1 | | 7/2004 | Beyda |
| 2005/0015471 A1 | | 1/2005 | Zhang et al. |
| 2005/0086384 A1 | | 4/2005 | Ernst |
| 2005/0114315 A1 | | 5/2005 | Tanner et al. |
| 2005/0138375 A1 | * | 6/2005 | Sadjadi ........................ 713/167 |
| 2006/0007944 A1 | | 1/2006 | Movassaghi et al. |
| 2006/0031427 A1 | * | 2/2006 | Jain et al. .................... 709/220 |
| 2006/0167878 A1 | | 7/2006 | Hartman |
| 2006/0168160 A1 | | 7/2006 | Pratt |

OTHER PUBLICATIONS

Response dated Jun. 26, 2006 for U.S. Appl. No. 10/223,813, 10 pgs.
Office Action dated Sep. 20, 2006 for U.S. Appl. No. 10/223,813, 25 pgs.
Amendment dated Dec. 20, 2006 for U.S. Appl. No. 10/223,813, 17 pgs.
Office Action dated Oct. 4, 2006 for U.S. Appl. No. 10/392,201, 26 pgs.
Amendment dated Feb. 5, 2007 for U.S. Appl. No. 10/392,201, 12 pgs.
Office Action dated May 1, 2007 for U.S. Appl. No. 10/392,201, 25 pgs.
Amendment dated Aug. 1, 2007 for U.S. Appl. No. 10/392,201, 14 pgs.
Office Action dated Feb. 19, 2008 for U.S. Appl. No. 10/392,201, 26 pgs.
Amendment dated Jun. 19, 2008 for U.S. Appl. No. 10/392,201, 18 pgs.
Office Action dated Jun. 7, 2006 for U.S. Appl. No. 10/339,719, 14 pgs.
Amendment dated Sep. 7, 2006 for U.S. Appl. No. 10/339,719, 14 pgs.
Office Action dated Dec. 12, 2006 for U.S. Appl. No. 10/339,719, 20 pgs.
Amendment dated Feb. 12, 2007 for U.S. Appl. No. 10/339,719, 16 pgs.
Office Action dated Apr. 5, 2007 for U.S. Appl. No. 10/339,719, 14 pgs.
Amendment dated Aug. 6, 2007 for U.S. Appl. No. 10/339,719, 16 pgs.
Office Action dated Oct. 19, 2007 for U.S. Appl. No. 10/339,719, 13 pgs.
Amendment dated Jan. 18, 2008 for U.S. Appl. No. 10/339,719, 15 pgs.
Office Action dated Apr. 14, 2008 for U.S. Appl. No. 10/339,719, 15 pgs.
Amendment dated Jul. 14, 2008 for U.S. Appl. No. 10/339,719, 17 pgs.
Office Action dated Sep. 20, 2006, for U.S. Appl. No. 10/223,813, filed Aug. 19, 2002, 25 pgs.
Amendment to Office Action dated Sep. 20, 2006, for U.S. Appl. No. 10/223,813, filed Aug. 19, 2005, 17 pgs.
Notice of Allowance dated Mar. 28, 2007, for U.S. Appl. No. 10/223,813, filed Aug. 19, 2002, 12 pgs.
U.S. Appl. No. 10/223,813, entitled "Private Configuration of Network Devices," filed Aug. 19, 2002, Gerraty et al.
U.S. Appl. No. 10/392,201, entitled "Application of a Configuration Patch to a Network Device," filed Mar. 17, 2003. Shafer.
U.S. Appl. No. 10/339,719, entitled "Generation of a Configuration Patch for Network Devices," filed Jan. 9, 2003, Gerraty.

* cited by examiner

GENERATION OF A CONFIGURATION PATCH FOR NETWORK DEVICES

This application is a Continuation-in-part of U.S. application Ser. No. 10/339,719, filed Jan. 9, 2003, and is a Continuation-in-part of U.S. application Ser. No. 10/392,201, filed Mar. 17, 2003, which claims the benefit of U.S. Provisional Application No. 60/446,286, filed Feb. 6, 2003 and is a Continuation-in-part of U.S. application Ser. No. 10/223,813, filed Aug. 19, 2002, the entire content of each of which is incorporated herein by reference.

TECHNICAL FIELD

This disclosure relates to computer networks, and more particularly, to configuring devices within computer networks.

BACKGROUND

A computer network is a collection of interconnected computing devices that exchange data and share resources. Computing devices within the network typically include a mechanism, referred to herein as a management interface, for directly or remotely configuring the network device. By interacting with the management interface, various clients, such as human users and automated scripts, can perform a vast amount of configuration tasks. As an example, the clients may configure interface cards of a router, adjust parameters for the supported network protocols of the router, specify the physical components within the routing device, modify the routing information maintained by the router, access software modules and other resources residing on the router, and the like.

In some network devices, the management interface allows a client to configure the present configuration of the network device using a commit-based model. In a commit-based model, a client issues one or more configuration commands, and then directs the management interface to apply the commands by issuing a "commit" command. Typically, the client may direct the management interface to disregard the commands by issuing a "rollback" command.

For example, a client typically places the network device in a configuration mode, often by issuing an edit command to the management interface. In this mode, the management interface may essentially "lock" the network device, and reject any configuration commands from other clients. Next, the client typically issues a number of commands directing the management interface to modify the present configuration, followed by a commit command that directs the network device to apply the commands. Upon receiving the commit command, the management interface exits the configuration mode, and applies the changes to the present configuration, thereby adjusting the operation of the network device. Finally, the management interface exits the configuration mode, effectively "unlocking" the network device and allowing configuration by another client.

As the complexity of computing networks has increased, there has been an increasing need for routers and other network devices to support concurrent configuration by multiple clients. Consequently, some devices allow multiple clients to concurrently issue configuration commands. In other words, the management interface of such a device does not "lock" the configuration of the device to a single client, but receives configuration commands from multiple clients while operating in configuration mode. When the management interface receives a commit command from any of the clients providing commands, the management interface applies all of the pending changes from all of the concurrent clients to the present configuration. These techniques can be problematic in that partial changes made by a client may be committed in response to a commit command from another client. Furthermore, uncommitted changes made by a client may be lost when another client issues a "rollback" command.

Moreover, the significant increase in network complexity over the last decade has also resulted in edge and core routers maintaining voluminous amounts of configuration data. Processing the configuration changes made by the multiple clients requires significant computing resources and time.

SUMMARY

In general, the disclosure describes techniques for allowing multiple clients to concurrently configure a network device. In particular, the clients can concurrently issue configuration commands to the network device, without the risk of having those partially completed modifications committed by another client or having the commands lost due to a rollback command from another client.

Consistent with the principles of this disclosure, a management module of the network device supports a command syntax in which a configure command may optionally specify a particular configuration mode. More specifically, the configure command may include an additional parameter that specifies an exclusive mode or private mode. Upon receiving a configure exclusive command, the management module locks the network device and allows a single client to make changes to the present configuration. In response to a configure private command, the management module places the device into a private configuration mode in which the client can issue configuration commands to the device. The management module does not lock the device, and allows other clients to concurrently issue configuration commands in a similar private configuration mode.

Regardless of the configuration mode entered into, the management module creates a "working copy" of a committed data source that stores the present configuration of the device. The management module applies configuration commands from the clients to the working copy. The working copy may comprise a shared database when the management module is operating in either the default configure mode or the configure exclusive mode. Alternatively, the working copy may comprise a private database when the management module is operating in the configure private mode.

Upon receiving a show|compare command from a client, the management module compares the committed data source with the working copy to generate a "configuration patch." Alternatively, the management module may generate the configuration patch in response to a commit command received from a client operating in the configure private mode. The patch represents the changes to the private data source, i.e., the differences between the working copy and the committed data source. In accordance with the techniques of this disclosure, the configuration patch may include modification control indicators that identify configuration objects in the list that are reordered. In addition, the configuration patch may include modification control indicators that identify added or deleted configuration objects.

The management module "applies" the patch to update the initial data source, either automatically in response to the commit command or in response to a load patch command received from the client, to reconcile the initial data source with the working copy. In one embodiment, the management module makes a temporary copy of the initial data source, and loads the patch into the temporary copy. If the load is successful, the management module replaces the initial data source with the temporary copy. When applying the patch, the management module recognizes modification control indicators that identify complex objects of a list that are reordered, and reorders the identified complex objects of the list within the previously committed data source without processing portions of the configuration data associated with the complex objects identified by the modification control indicators. In addition, the management module recognizes modification control indicators that identify added or deleted configuration objects, adds or deletes the identified objects and processes configuration data associated with the objects.

By utilizing modification control indicators that indicate reordered objects, the management module reduces the amount of processing necessary to reconfigure the network device. In particular, the management module recognizes the modification control indicators that indicate reordered objects and reorders those objects without processing the data associated with the reordered configuration objects. Without such modification control indicators, however, the management module would treat each of the reordered elements as newly added elements and therefore reprocess the configuration data associated with the reordered objects even though the underlying configuration data is unchanged. This unnecessary processing may result in excess churn in the management module.

In one embodiment, a method for configuring a network device comprises creating a working copy of an initial data source that stores configuration data for a network device. The working copy includes a set of configuration objects logically arranged in an order and each of the configuration objects is associated with respective configuration data. The method further comprises modifying the working copy to reorder one or more of the configuration objects in response to a reorder command from a client and generating a configuration patch that is a textual representation of any differences between the working copy and the initial data source. The configuration patch includes one or more modification control indicators that identify the configuration objects that have been reordered and for which the respective configuration data is unchanged. The method also includes applying the configuration patch to the initial data source to reorder the identified configuration objects within the initial data source without processing the respective configuration data associated with the configuration objects identified by the modification control indicators.

In another embodiment, a network device comprises an initial data source that stores configuration data for the network device and a management module that generates a configuration patch that is a textual representation of any differences between a working copy of the initial data source and the initial data source. The configuration patch generated by the management module includes one or more modification control indicators that identify configuration objects that have been reordered and for which respective configuration data is unchanged. The management module also applies the configuration patch to the initial data source to reorder the identified configuration objects within the initial data source without processing the respective configuration data associated with the reordered configuration objects identified by the modification control indicators.

In another embodiment, a computer-readable medium comprises instructions to cause a processor to create a working copy of an initial data source that stores configuration data for a network device. The working copy comprises a shared data source editable by a plurality of clients. The working copy includes a set of configuration objects logically arranged in an order, and each of the configuration objects is associated with respective configuration data. The instructions further cause the processor to receive configuration commands from the plurality of clients, modify the working copy to reorder one or more of the configuration objects in response to commands received from the client, and generate a configuration patch that is a textual representation of any differences between the working copy and the initial data source. The configuration patch includes one or more modification control indicators that identify the configuration objects that have been reordered and for which the respective configuration data is unchanged. The instructions also cause the processor to apply the configuration patch to the initial data source to reorder the list of configuration objects within the initial data source without processing portions of the configuration data associated with the reordered configuration objects identified by the modification control indicators.

The details of one or more embodiments are set forth in the accompanying drawings and the description below. Other features, objects, and advantages of the techniques of this disclosure will be apparent from the description and drawings, and from the claims.

DETAILED DESCRIPTION

Figure 1:
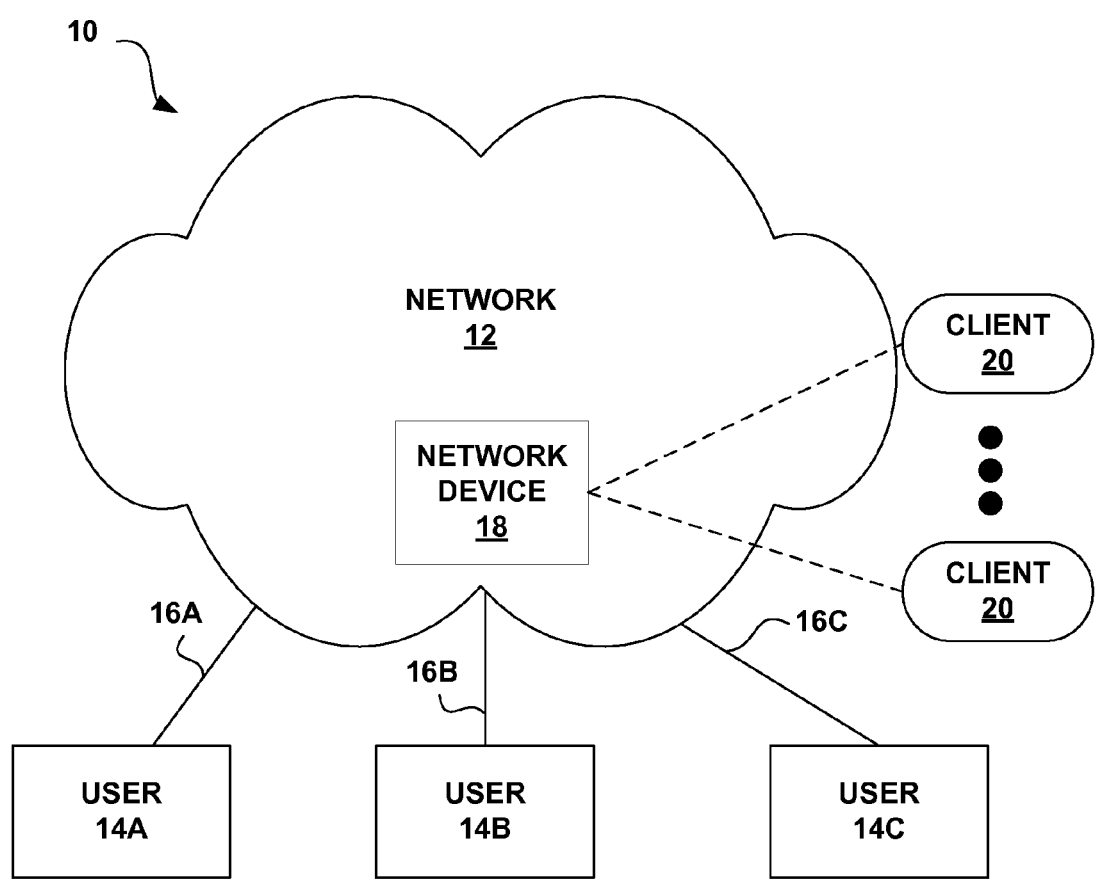
FIG. 1 is a block diagram illustrating an example computer network having a network device that supports a private configuration mode.

FIG. 1 is a block diagram illustrating an example computer network 10 in which network device 18 supports a private configuration mode. Computer network 10 comprises a network 12 that may be accessed by users 14A to 14C (collectively users 14) via one of links 16A to 16C (collectively links 16). Each of users 14 represents an entity, such as an individual or an organization, that accesses network 12 to communicate with other users connected to network 12. Links 16 may be Ethernet or other network connections.

Network device 18 represents any device operating within computing network 10, such as a network hub, network switch, network router, or the like. Network device 18 may include an interface that allows various clients 20, such as human users and automated scripts, to configure network device 18 by specifying protocols to follow, physical arrangements of hardware, or the like. For example, network device 18 may be a network router, and clients 20 may specify configuration information to configure interface cards of the router, adjust parameters for the supported network protocols, specify the physical components within the routing device, modify the routing information maintained by the router, access software modules and other resources residing on the router, and the like.

As described in detail, network device 18 supports a command syntax in which a configure command may optionally specify a particular configuration mode. More specifically, the configure command may include an additional parameter that specifies an exclusive mode or a private mode. Upon receiving a configure exclusive command from one of clients 20, network device 18 locks the primary configuration, and only allows the requesting client to make changes to the present configuration.

In response to a configure private command from one of clients 20, network device 18 enters a private configuration mode in which multiple clients 20 can issue configuration commands to device 18. In particular, for each of clients 20 that issues a configure private command, network device 18 creates a respective private data source from a committed data source that stores the present configuration of the device. In this manner, network device 18 creates a working copy of the committed data source for each client.

Network device 18 applies configuration commands from clients 20 to their respective private data sources. Upon receiving a commit command from any given one of clients 20, network device 18 generates a "configuration patch" by comparing the committed data source with a temporary copy of the edited private data source. The configuration patch is a textual representation of any differences between the working copy and the initial data source. In other words, the patch represents the changes made to the private data source. Network device 18 further supports a show|compare command for generation of the configuration patch. In this case, the changes represented in the configuration patch may be committed at a later time, e.g., in response to a load patch command.

Network device 18 updates the committed data source based on the changes identified in the configuration patch. In particular, network device 18 applies the patch to a copy of the committed data source, and replaces the committed data source if the application is successful. As described below, the configuration patch may include one or more modification control indicators that identify complex objects in a list that have been reordered without modification to the underlying configuration data. In applying the configuration patch, network device 18 applies the configuration patch to the copy of the committed data source to reorder the list of complex objects within the data source without processing portions of the configuration data associated with the complex objects identified by the modification control indicators. In this manner, network device 18 avoids unnecessary processing of configuration data that is not modified in any manner other than the order in which it appears in the configuration database. This may, for example, save computing resources and processing time, especially for complex network where the configuration data may be significant in size.

When applying the patch, network device 18 resolves any conflicts that may exist between the private data source being committed and any changes to the committed data source made by other clients 20 while the private data source was being edited. If one of clients 20 issues a rollback command when in private configuration mode, only the respective private data source created for the client is discarded and refreshed. Consequently, clients 20 may edit the private data source without risk of premature commitment of the changes, or loss of the changes, due to another one of clients 20.

Figure 2:
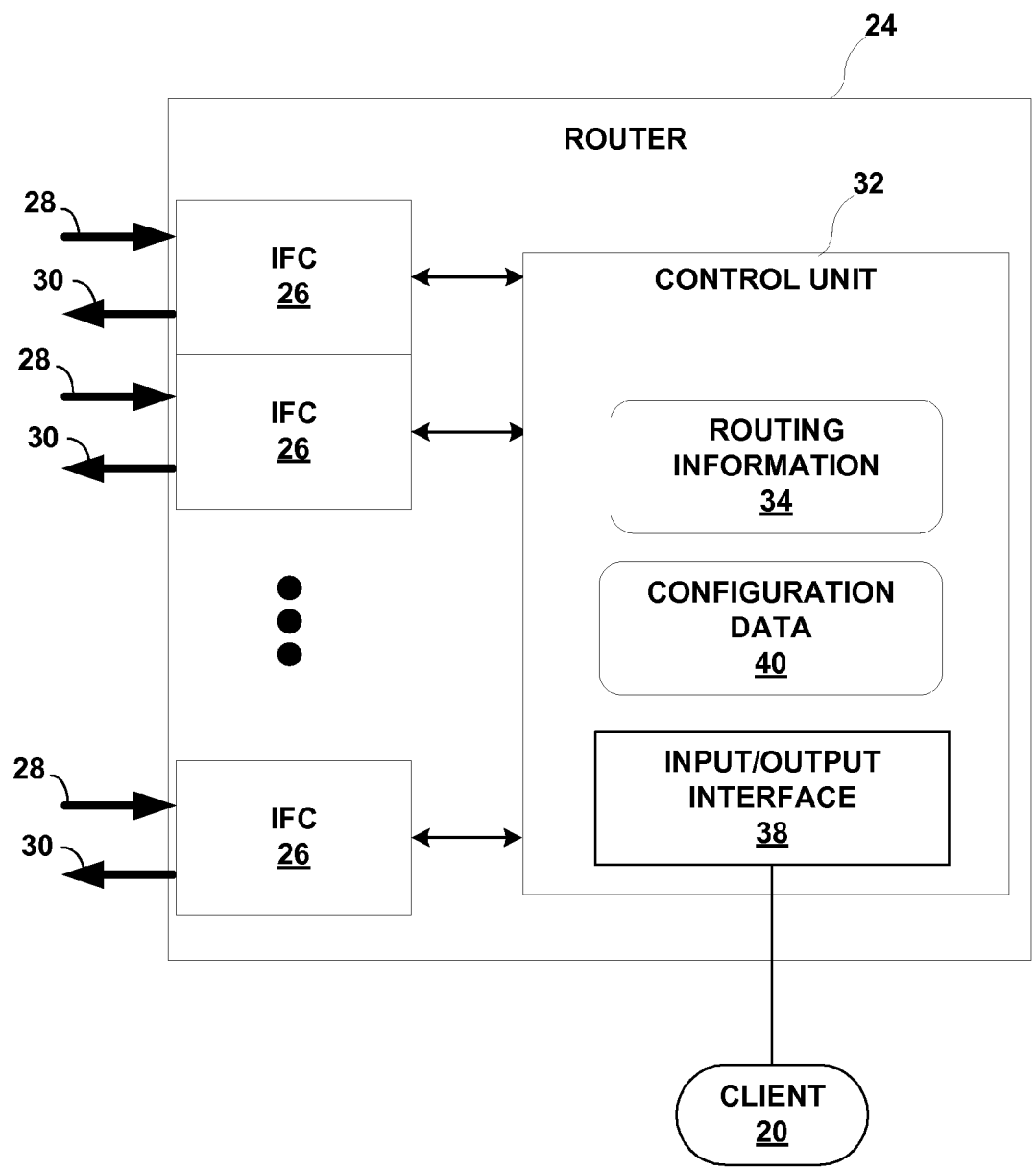
FIG. 2 is a block diagram illustrating an example network router that supports a private configuration mode.

FIG. 2 is a block diagram illustrating an example network router 24 that supports a private configuration mode. Router 24 includes a set of one or more interface cards (IFCs) 26 that receive and send packets via network links 28 and 30, respectively. IFCs 26 are typically coupled to network links 28, 30 via one or more interface ports.

Router 24 further comprises a control unit 32 that maintains routing information 34. Routing information 34 describes the topology of network 12 and, in particular, routes through network 12. Routing information 34 may include, for example, route data that describes various routes within network 12, and corresponding next hop data indicating appropriate neighboring devices within network 12 for each of the routes. Routing information 34 is periodically updated to accurately reflect the topology of network 12. In general, router 24 receives a packet via inbound network link 28, control unit 32 determines the destination address of the packet and outputs the packet on an outbound network link 30 based on the destination.

Control unit 32 may receive configuration input from a client 20 via an input/output (I/O) interface 38. I/O interface 38 may be a command line interface (CLI) or other suitable interface, for processing user or script-driven commands. Control unit 32 may store the configuration input received from client 20 as configuration data 40, which may take the form of a text file, such as an ASCII file. Alternatively, control unit 32 may process the configuration input and generate configuration data 40 in any one of a number of forms, such as one or more databases, tables, data structures, or the like.

In response to receiving a configure command, a management module of router 24 may parse the command, and place router 24 in a configuration mode for receiving configuration data 40 from client 20. Configuration data 40 may take the form of one or more commands for adding new settings to the current configuration of the router, commands for deleting or modifying existing settings of the current configuration, commands for reordering complex objects logically arranged in an order of the current configuration, or combinations thereof. Router 24 may further parse configuration data 40, input from client 20, and resolve the references to appropriately configure router 24. Upon receiving a commit command, the management module applies configuration data 40 to router 24.

In this manner, a syntax for the configuration command may be expressed as follows:

configure [configuration mode], where configuration mode may specify private or exclusive, and is optional.

The following pseudocode illustrates an exemplary use of a configure command:

--- user@host> configure private
user@host# set system host-name router_25
user@host# commit

---

In the above pseudocode client 20 issues a configure private command directing router 24 to enter a configuration mode and, more particularly, to enter a private configuration mode. While in the private configuration mode, client 20 then issues a command to modify the current host name of router 24, i.e., set system host-name. Although not shown in the pseudocode above, client 20 may additionally issue one or more commands to reorder certain configuration objects of configuration data 40 without modification to the underlying configuration data associated with the configuration objects. For example, client 20 may issue a specific reorder command followed by a reordered list or other structure specifying configuration objects. Alternatively, client 20 may resubmit configuration objects and the management module may automatically determine that the order of the configuration objects has merely been rearranged without modification to the configuration data associated with the objects. Finally, client 20 issues a commit command directing router 24 to verify and accept the changes as described herein.

Figure 3:
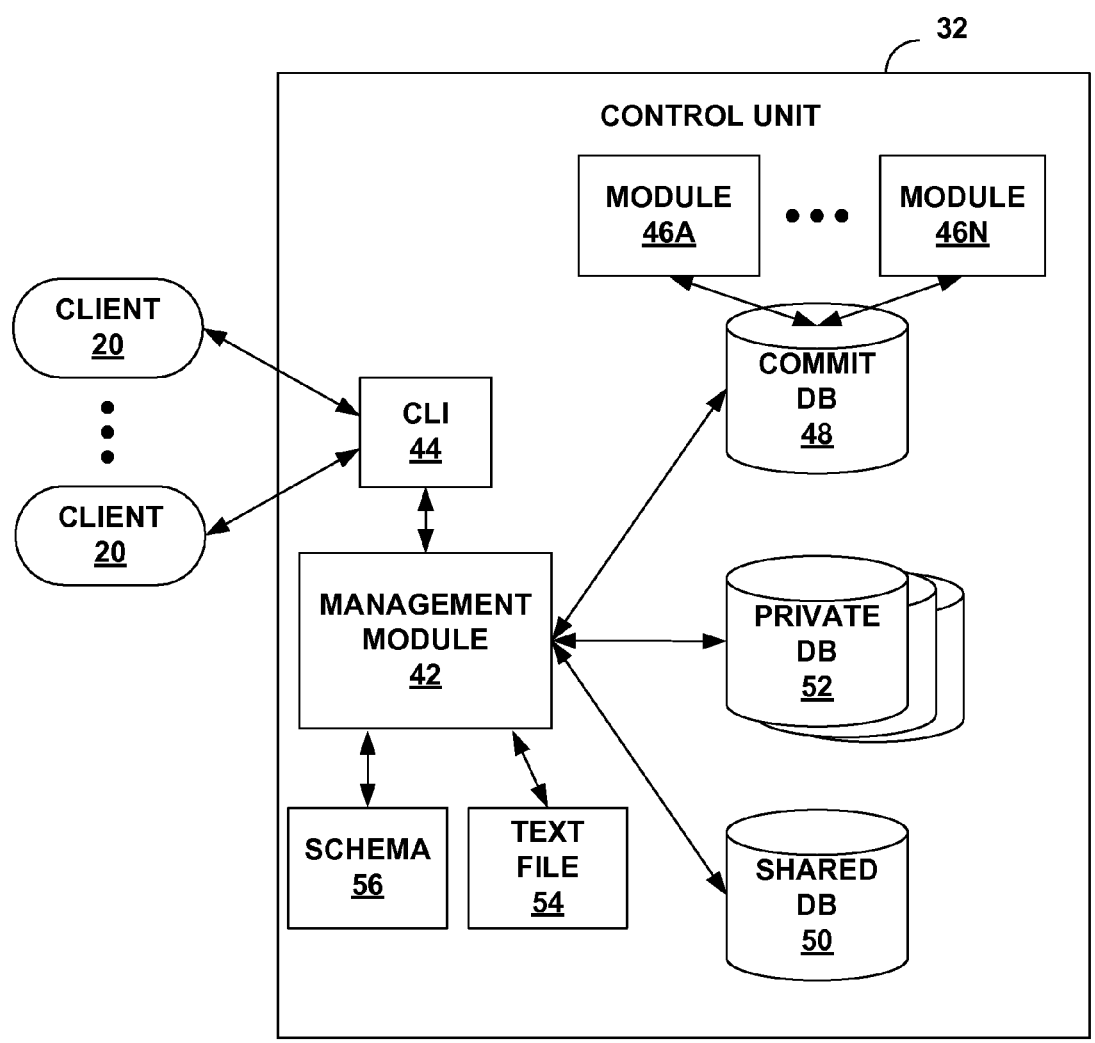
FIG. 3 is a block diagram illustrating an example control unit that supports operation in a private configure mode.

FIG. 3 is a block diagram illustrating an example control unit 32 that supports operation in a private configure mode. Control unit 32 comprises a management module 42 that communicates with one or more of clients 20 via a command line interface (CLI) 44. CLI 44 serves as a daemon process that listens for requests from clients 20. Upon receiving a request from one of clients 20, CLI 44 may relay the request to management module 42. However, CLI 44 may give way to direct communication between client 20 and management module 42.

Control unit 32 may further include one or more software modules 46A to 46N, collectively referred to as software modules 46. Software modules 46 represent threads of execution, and typically execute within an operating environment provided by an operating system. Software modules 46 may, for example, include a routing protocol module to administer protocols supported by router 24, a chassis module to account for the physical components of router 24, a device configuration module to control the physical configuration of router 24 or the like.

Control unit 32 may include a committed data source, referred to as committed database (COMMIT DB) 48, that stores a present configuration of router 24. In other words, router 24 operates in accordance with configuration information stored in committed database 48. Control unit 32 may further include a shared data source referred to as shared database (SHARED DB) 50, that contains a copy of the configuration data of committed database 48, and is typically used for editing the configuration without impacting operation of router 24. In this sense, shared database 50 may be viewed as a working copy of the committed database 48, i.e., a copy of committed database 48 in which the user may edit the configuration information. For example, clients 20 may access shared database 50 simultaneously and each of clients 20 may make changes to the configuration data stored in shared database 50. In this manner, shared database 50 is editable by a plurality of clients.

Management module 42 may receive a command from one of clients 20 to configure router 24. Management module 42 may parse the command from client 20, and place router 24 in the configure mode requested by client 20. Router 24 may be configured using one of several different configuration modes, such as a default configuration mode (referred to as configure mode), an exclusive configuration mode, a private configuration mode, or the like.

In the default configuration mode, management module 42 allows multiple clients 20 to simultaneously access shared database 50 and concurrently edit the configuration data stored in shared database 50. Management module 42 may operate in the default configuration mode, for example, when clients issue a configuration command without specifying a particular configuration mode.

In exclusive configuration mode, management module 42 allows one of clients 20 to edit configuration data of shared database 50. However, when configuring in exclusive configuration mode, shared database 50 may be locked, allowing for only one client 20 at a time to edit configuration data of shared database 50. The lock may further prevent client 20 from creating any interference from other clients 20 when issuing a commit or rollback command.

In private configuration mode, management module 42 allows clients 20 to edit configuration data in respective private data sources, referred to as private databases (PRIVATE DB) 52. For each of clients 20 that issue a configure private command, management module 42 creates a respective private database 52, each of which represent a copy of committed database 48 created at the time the management module 42 receives the corresponding configure command. In this manner, network device 18 creates a working copy of the committed data source for each client. In addition, management module 42 may generate a copy of a configuration text file 54, such as an ASCII configuration file that represents an authoritative version of the committed configuration, and that may contain configuration data that is used by control unit 32 during restart.

Independent of the configuration mode entered by client 20, management module 42 may generate a configuration patch by comparing changes made to the working copy of the committed database, e.g., shared database 50 or private database 52, with the configuration data of text file 54. Thus, the configuration patch is a textual representation of any differences between the working copy and the committed database. Management module 42 may, for example, generate the patch in response to a show|compare command or in response to a commit command. Management module 42 applies the patch to committed database 48. In applying the configuration patch, management module 42 recognizes modification control indicators that identify a set of complex objects that have been reordered, and reorders the identified complex objects within the committed database 48 without processing portions of the configuration data associated with the complex objects identified by the modification control indicators. In addition, management module 20 recognizes modification control indicators that identify an added configuration object or a deleted configuration object, adds or deletes the configuration object and processes configuration information associated with the objects.

By utilizing modification control indicators that indicate reordered objects, management module 42 may reduce the amount of computing resources or processing time necessary to reconfigure the network device. In particular, management module 42 recognizes the modification control indicators that indicate reordered objects and reorders those objects without processing the data associated with the reordered configuration objects. Without such modification control indicators, however, management module 42 would treat each of the reordered elements as newly added elements. This may, in turn, cause management module 42 to reprocess the configuration data associated with the reordered objects and update the configuration data for the objects within the configuration databases even though the underlying configuration data is unchanged. This unnecessary processing may result in excess "churn" in management module 42 and generally reduce the responsiveness of management module 42 to its clients.

Management module 42 also validates the updated configuration. In one example, management module 42 determines whether the configuration data conforms to a schema 56 of the committed database. More specifically, schema 56 may be used to determine whether the configuration data is semantically valid. In addition, management module 42 may direct software modules 46 to validate specific parameters or settings within the updated configuration data.

Based on the validation, management module 42 may either reject the pending configuration data, or accept the pending configuration data. For example, management module 42 may accept the pending configuration data, and update the configuration data of committed database 48 to reflect the changes made by client 20. Management module 42 may then proceed to notify software modules 46 that committed database 48 contains updated configuration information. Software modules 46 may retrieve the new configuration data from committed database 48, and router 24 may begin to operate in accordance with the new configuration data.

Figure 4:
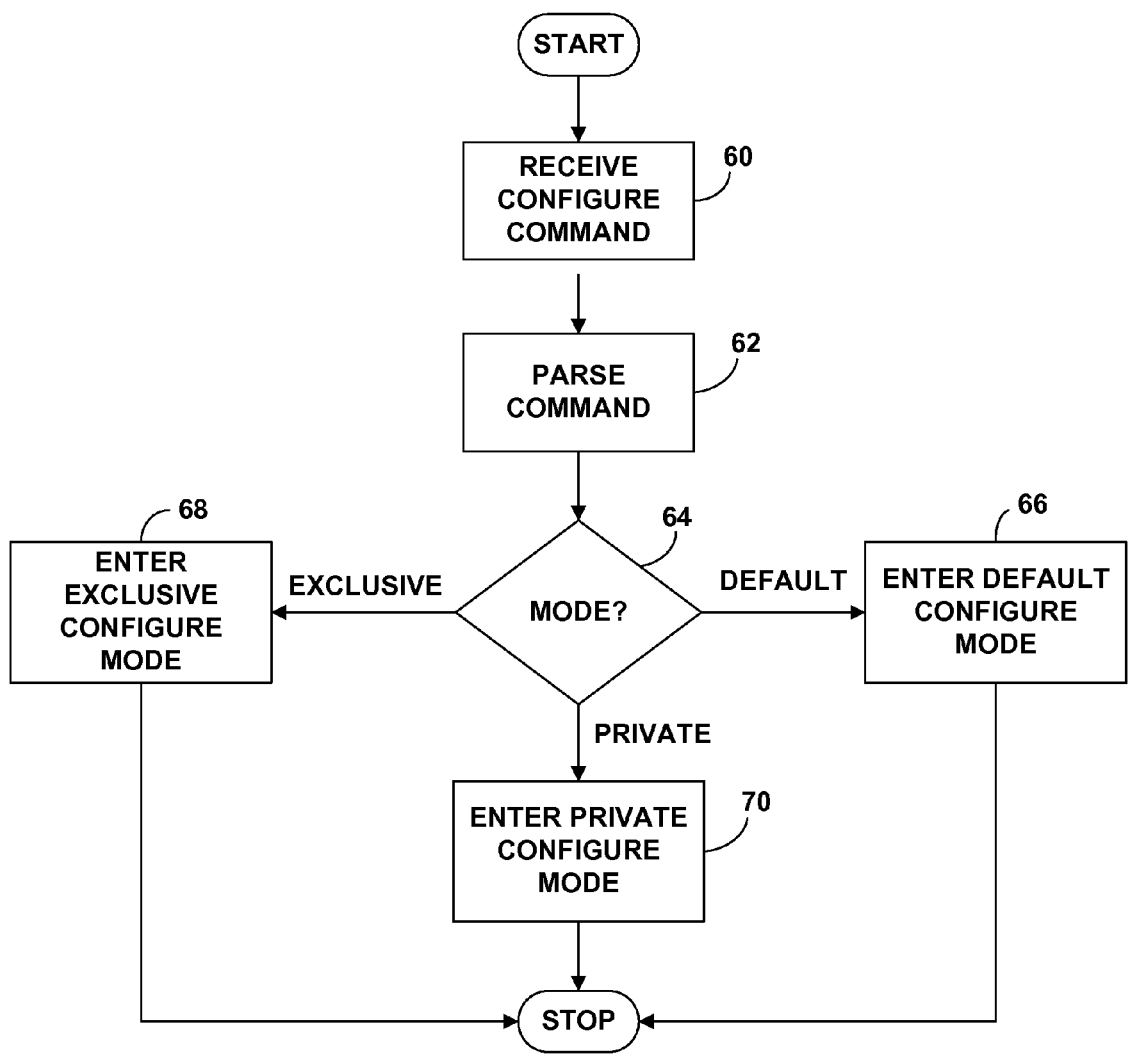
FIG. 4 is a flowchart illustrating a management module entering a configuration mode in response to a configure command from a client.

FIG. 4 is a flowchart illustrating management module 42 entering a configuration mode in response to a configure command from one of clients 20. Initially, management module 42 receives a command from one of clients 20 to configure router 24 (60). In response to receiving a configure command from one of clients 20, management module 42 may parse the command to determine which configuration mode to operate in (62, 64). When the configure command includes no additional parameters that specify a particular configuration mode, management module 42 operates in a default configure mode (66). In this mode, management module 42 allows clients 20 to concurrently edit shared database 50. If one of clients 20 issues a commit command, all of the changes, complete or incomplete, made by clients 20 may be committed to committed database 48.

When the configure command includes the additional parameter exclusive, management module 42 operates in an exclusive configure mode (68). In exclusive configuration mode, management module 42 allows only one of clients 20 to edit configuration data of shared database 50 at a time. Allowing only one client 20 at a time to edit shared database 50 may prevent interference between client 20 in the exclusive configure mode and other clients 20 in different configuration modes. When receiving a commit command from the client 20 in the exclusive configure mode, management module 42 copies shared database 50 to committed database 48.

When the configure command includes the additional parameter private, management module 42 operates in a private configure mode (70). In private configure mode multiple clients 20 may concurrently issue configuration commands to management module 42. In particular, for each of clients 20 that issues a configure private command, management module 42 creates a respective private database 52 from committed database 48 that stores the present configuration of the device. Management module 42 applies configuration commands from clients 20 to their respective private databases 52. Upon receiving a commit command from any given one of clients 20, management module 42 merges the committed database 48 into a temporary copy of the respective one of private database 52 being committed to generate a "configuration patch." In particular, management module 42 generates the patch to represent the changes to private database 52, i.e., the differences between the private database and the committed data source.

While operating in any of the configuration modes, management module 42 may also generate a configuration patch in response to a show|compare command received from one of clients 20. In a general sense, the show|compare command may be used to generate a configuration patch that lists the differences between an initial data source, e.g., committed database 48 or configuration text file 54, and a working copy of the initial data source, e.g., private database 52 or shared database 50. In response to the show|compare command, the management module creates a temporary copy of the working copy, and merges the initial data source into the working copy to generate the patch.

The management module "applies" the patch to update the initial data source, either automatically in response to the commit command or in response to a load patch command received from the client, to reconcile the initial data source with the working copy. For example, the load patch command may be used to reconcile committed database 48 with one of private databases 52. Alternatively, the load patch command may be used to reconcile committed database 48 with shared database 50. In one embodiment, management module 42 makes a temporary copy of the initial data source, e.g., committed database 48, and loads the patch into the temporary copy to apply the patch. If the load is successful, management module 42 replaces the initial data source with the temporary copy. When applying the patch, management module 42 resolves any conflicts that may exist between the working copy and any changes to the initial data source made by other users while the working copy was being edited.

Figure 5:
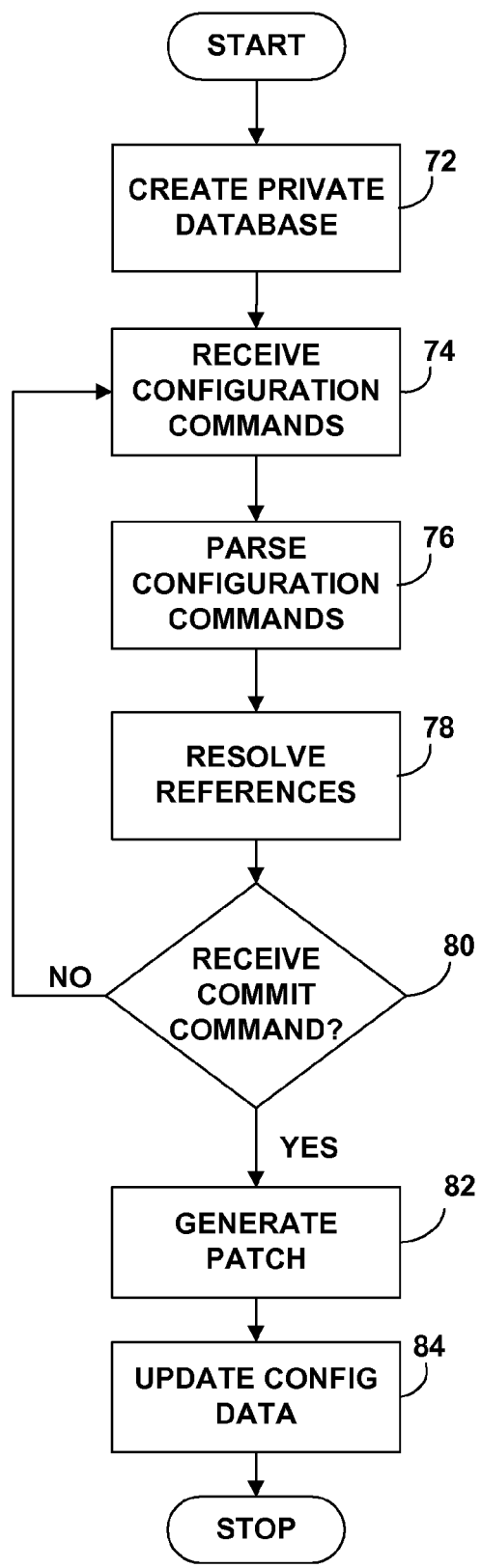
FIG. 5 is a flowchart illustrating a management module operating in a private configure mode in response to receiving a configure private command.

FIG. 5 is a flowchart illustrating management module 42 operating in a private configure mode in response to receiving a configure private command. In response, management module 42 creates a private database 52 for the requesting client 20 that issued the configure private command (72). As described, private database 52 may be a replicate of committed database 48 at the time the request is received. In this manner, private database 52 may be viewed as a working copy of committed database 48. Alternatively, private database 52 may be a copy of configuration data in shared database 50. In addition, management module 42 may make a corresponding copy of configuration text file 54, which may comprise an ASCII file, at the time of the request.

Next, client 20 may edit the configuration data of private database 52 by issuing one or more configuration commands to management module 42 (74). Client 20 may edit the configuration data of private database 52 by issuing configuration commands for adding new settings to the current configuration information, commands for deleting or modifying existing settings of the current information, commands for reordering complex objects of the current information, or combinations thereof. Private database 52 allows client 20 to edit data without interference from other clients 20 who may also be editing the configuration of router 24. For example, if client 20 issues a rollback command, the configuration data of the respective private database 52 may be updated with a current copy of configuration data from committed database 48. Meanwhile, the edited configuration data of a private database 52 associated with another one of clients 20 remains unchanged.

Management module 42 may parse the configuration commands input from client 20, and resolve the references to appropriately configure router 24 (76, 78). Management module 42 waits to receive a commit command that indicates the completion of editing of private database 52 (80). When a commit command has not been received from client 20, management module 42 continues to receive configuration commands. However, upon receiving a commit command, management module 42 generates a patch representing the changes to private database 52 (82). The configuration patch is a textual representation of any differences between the working copy and the initial data source. In one embodiment, the configuration patch includes one or more modification control indicators that identify a set of complex objects (e.g., a list of objects) that have been reordered. Management module 42 applies the patch to committed database 48 (84). The modification control indicators allow network device 18 to apply the configuration patch to reorder the list of complex objects within committed database 48 without processing portions of the configuration data associated with the complex objects identified by the indicators. Once the configuration data of committed database 48 is updated, router 24 may begin to operate in accordance with the new configuration data.

Figure 6:
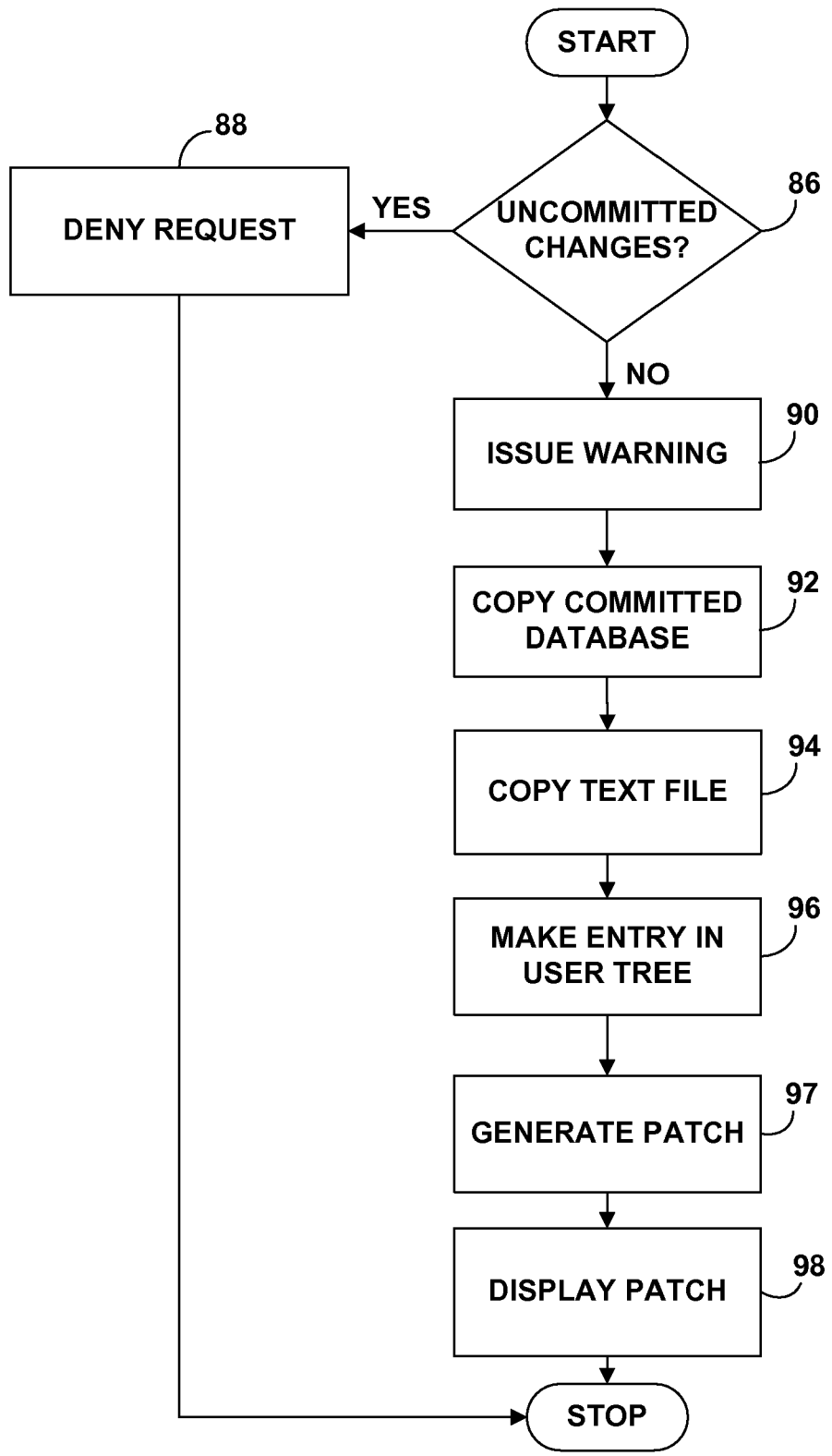
FIG. 6 is a flowchart illustrating a management module creating a private configuration database when operating in a private configure mode.

FIG. 6 is a flow chart illustrating management module 42 creating a private configuration database 52 when operating in a private configure mode. In response to receiving a configure private command, management module 42 verifies that shared database 50 does not contain any uncommitted changes (86). Shared database 50 may contain uncommitted changes if another one of clients 20 is in the process of editing configuration information. If shared database 50 contains uncommitted changes, management module 42 does not permit client 20 to enter into the private configuration mode. In that case, client 20 may need to wait until shared database 50 is unmodified before entering a private configure mode (88).

If shared database 50 does not contain any uncommitted changes, management module 42 may issue a warning to client 20 that any uncommitted changes to private database 52 will be discarded (90). Uncommitted changes may be discarded upon exiting private configuration mode, or on a timeout basis. For example, if client 20 leaves the private configuration mode unattended for more than ten minutes, management module 42 may discard private database 52 along with its changes. Alternatively, private configuration mode may not discard uncommitted changes. In that case, management module 42 may, for example, allow client 20 to enter a private configuration mode, make changes to the respective private database 52, and exit the private configuration mode without discarding the changes made by client 20. Client 20 may then enter a private configuration mode later to continue making changes to the respective private database 52.

Management module 42 copies the configuration data of committed database 48 to private database 52 (92). Furthermore, management module 42 may generate a copy of text file 54 that may contain configuration data used by management module 42 during restart. (94). An entry may be made in the user tree of shared database 50 indicating that a private configuration mode is in session (96). Client 20 may edit the configuration data of private database 52 by issuing one or more configuration commands to add new settings to the current configuration of router 24, delete or modify existing settings of the current configuration, reorder complex objects logically arranged in an order of the current information, or combinations thereof. Client 20 may issue a show|compare command directing management module 42 to generate a patch listing the differences between the configuration data of private database 52 and the copy of text file 54 (97). Management module 42 may further display to client 20 the generated patch (98). Client 20 may save the patch, and load the patch at another time. For example, the pseudocode below illustrates the exemplary use of the show|compare command.

```
user@host> configure private
user@host# set system host-name Bob
user@host# show|compare
[edit system]
– host-name Fred
+ host-name Bob
```

In the above pseudocode client 20 issues a configure private command directing management module 42 to operate in a private configuration mode. While in the private configuration mode, client 20 then issues a command to modify the current host name of router 24, i.e., set system host-name. Finally, client 20 issues a show|compare command directing management module 42 to generate a patch. Management module 42 merges the edited configuration data of the respective private database 52 with the copy of text file 54 to generate a patch, and may display the patch to client 20 as shown above. The patch indicates that host name Fred, the current host name of the system, is being removed (hence the minus sign in front of it) and the host-name Bob is being added (the plus sign in front of it).

In the pseudocode below, client 20 reorders name servers using the techniques described in this disclosure.

```
user@host# edit system name_server
user@host# show name_server {
    10.1.1.1;
    10.3.1.1;
    10.2.1.1
}
user@host# insert 10.2.1.1 after 10.1.1.1;
user@host# set system name-server 10.2.1.1 xyz;
user@host# show | compare
[edit system name server]
    10.1.1.1 {...}
    ! 10.2.1.1 {...}
[edit system name-server 10.2.1.1]
    + xyz;
```

In the pseudocode above, client 20 issues a command to edit the current host name servers used by router 24, i.e., edit system name server. Client 20 issues a command to show the current list of name servers, i.e., show name server. In response to the show name server command, a list of IP addresses associated with the name servers is provided. The list of name servers is ordered such that router 24 accesses name server 10.1.1.1 before 10.3.1.1, and accesses name server 10.3.1.1 before 10.2.1.1. Client 20 issues a command to reorder the name servers, i.e., the insert command. Following the command to reorder the name servers, client 20 identifies the reordering to perform. In the example illustrated in the pseudocode above, client 20 directs name server 10.2.1.1 to be reordered to follow 10.1.1.1, instead of following 10.3.1.1. In this case, client 20 changes the relationship of the name servers so that name server 10.2.1.1 comes before name server 10.3.1.1. In this manner, client 20 identifies the configuration objects of the list to be reordered. After the reordering, router 24 will access name server 10.2.1.1 prior to 10.3.1.1. Additionally, client 20 issues a command to modify the current host name of name server 10.2.1.1, i.e., set system name server. In particular, client 20 sets the xyz attribute of name server 10.2.1.1.

Finally, client 20 issues a show|compare command directing management module 42 to generate a patch. Management module 42 merges and/or compares the edited configuration data of the respective private database 52 with the copy of text file 54 to generate a patch, and may display the patch to client 20 as shown above. In the example illustrated above, the patch includes two patch blocks. The first patch block (i.e., [edit system name server]) indicates that the ordered relation of name server 10.2.1.1 has been reordered (indicated by use of an exclamation point (!) as a modification control indicator in front of name server 10.2.1.1) such that name server 10.2.1.1 now logically follows name server 10.1.1.1 without change to their respective configuration data. The second patch block (i.e., [edit system name server 10.2.1.1]) indicates the addition of an attribute associated with name server 10.2.1.1. This addition is represented in the patch block by the attribute set for name server 10.2.1.1, i.e., 'xyz', with a plus (+) sign in front of it. The addition of the attribute 'xyz' to name server 10.2.1.1 requires processing of its respective configuration data. In this manner, the configuration data associated with the reordered object name server 10.2.1.1 is not changed by the reordering of the configuration objects, but the respective configuration data may be changed by subsequent configuration commands.

In this manner, the show|compare command displays the changes to the private database 52 against the most recently committed global configuration. The general syntax for the generated configuration patch can be expressed as follows:

```
[edit list location]
    leading context identifier;
    ! reordered object 1;
    ! reordered object 2;
    trailing context identifier;
    .
    .
    .
[edit list location]
    leading context identifier;
    ! reordered object 1;
    ! reordered object 2;
    trailing context identifier;
[edit location]
    leading context identifier;
    ± updated object;
    ± updated object;
    trailing context identifier;
    .
    .
    .
[edit location]
    leading context identifier;
    ± updated object;
    ± updated object;
    trailing context identifier;
```

As illustrated, the configuration patch identifies one or more "locations" within the configuration data that have been changed. In general, a location refers to a list or "container" of related configuration objects within the configuration data. For example, the location "system name server" may contain one or more objects that describe configuration information for a respective domain name server (DNS).

Each changed location, e.g., container or list, is identified within the configuration patch by a header that lists the name of the location within the configuration data. The header takes the form of [edit location], where location indicates the name of the location that has been changed. For an identified location, the configuration patch may include a leading context identifier that indicates the object within the container that immediately precedes the listed changes. Alternatively, the configuration patch may include a trailing context identifier to indicate the object within the location that immediately follows the changed object. These identifiers may be used by management module 42 to precisely locate the point of change within the configuration data. More specifically, management module 42 examines the current objects within the configuration data being modified, and readily applies the changes of the configuration patch based on context identifiers to preserve any desired order of the configuration objects.

The configuration patch lists one or more objects to be changed between the leading context identifier and trailing context identifier, if present. Each object to be changed is preceded by a modification control indicator, e.g., a plus (+) sign, a minus (−) sign, or an exclamation mark (!). A plus sign, for example, indicates that the listed object is to be inserted, while a minus sign indicates the object is to be deleted. An exclamation mark indicates that the listed object is to only be reordered. Thus, the exclamation mark modification control indicator indicates to management module 42 that the specified object only needs to be reordered, thereby allowing management module 42 to reorder the configuration objects preceded by the reorder modification control indicator without further processing configuration data associated with the identified configuration object. In this manner, management module 42 simply reorders the configuration objects instead of having to delete all the configuration objects of the list that are reordered, add the same configuration objects to the list in a different order and process configuration data associated with the configuration objects. If one or more of the reordered configuration objects have in fact changed, such changes may be made using the configuration commands for adding, deleting or modifying configuration objects.

The following provides a more detailed example configuration patch generated in response to a show|compare command or in response to a commit command.

```
[edit system]
-           host-name edge1_router;
+           host-name egde2_router;
[edit system login]
-           user remote {
-               full-name "Radius/Jones authenticated";
-               uid 21000;
-               class superuser;
-           }
[edit system login]
+           user template {
+               full-name "Radius/Jones authenticated";
+               uid 21000;
+               class superuser;
+           }
[edit system name_server]
            10.1.1.1 {...}
!           10.2.1.1 {...}
[edit system name-server 10.2.1.1]
+           xyz;
```

The above example configuration patch includes five (5) headers that identify patch blocks that indicate the modification of five separate locations within the configuration data. The first header, [edit system], indicates that the location system is modified. The following lines indicate that within the system location the object host-name having a value of edge_router_1 is to be deleted, and the object host-name having a value of edge_router_2 is to be inserted.

The second and third headers within the configuration patch, [edit system login], indicates that the location system login is modified. The text following the second header indicates that user remote location within the system login is to be completely deleted. The text following the third header indicates that the location user template is to be inserted. This portion of the example configuration patch may, for example, be a result of a configuration command to rename user remote within system login to user template.

Next, the patch block with header edit sys term name server indicates that name server 10.2.1.1 has been reordered within the location system name server. In particular, the configuration patch indicates that the container system name server has been modified to reorder existing name server 10.2.1.1 after name server 10.1.1.1. In this manner, the object 10.1.1.1 operates as a leading context identifier to indicate the precise point of the reordered objects. The reordering results in name server 10.2.1.1 following name server 10.1.1.1 without change to their respective, underlying configuration data.

The last patch block with header edit system name_server 10.2.1.1 indicates that the location system name server 10.2.1.1 is modified to include the attribute xyz for name server 10.2.1.1.

By utilizing modification control indicators that indicate reordered objects, management module 42 may reduce the amount of computing resources or processing time necessary to reconfigure the network device. In particular, management module 42 recognizes the modification control indicators that indicate reordered objects and reorders those objects without processing the data associated with the configuration objects. Without such modification control indicators, however, management module 42 may otherwise treat each of the reordered elements as newly added elements and therefore reprocess the configuration data associated with the reordered objects even though the underlying configuration data is unchanged. This unnecessary processing may result in excess churn in management module 42.

Although described in reference to the reordering of a list of name servers, the techniques for reordering configuration objects without processing respective configuration data may be utilized to reorder other types of configuration objects. For example, the techniques may be utilized to reorder lists of other types of servers, such as RADIUS servers, without changing a configuration of the RADIUS servers. Moreover, the techniques may be useful in arranging other types of ordered configuration data, such as rearranging of an order in which rules of two or more filters are applied without changing underlying configuration data of the filters.

Furthermore, although described in reference to the configuration of a private database 52 in response to a configure private command, the techniques for generation of a configuration patch are not so limited. In a general sense, the show|compare command may be used to generate a configuration patch that lists the differences between an initial data source and a working copy of the initial data source. In this manner, the show|compare command may be used with a shared data source within the network device editable by multiple clients, or with a private data source editable by a corresponding client in a private configuration mode.

Moreover, the techniques may be used to generate and distribute configuration patches to other network devices. A system administrator may use a single router, for example, as a central point for configuring a network having multiple routers. In particular, upon making one or more changes to the central router, the system administrator may generate a configuration patch using the show|compare command, and distribute the configuration patch to the other devices.

Figure 7:
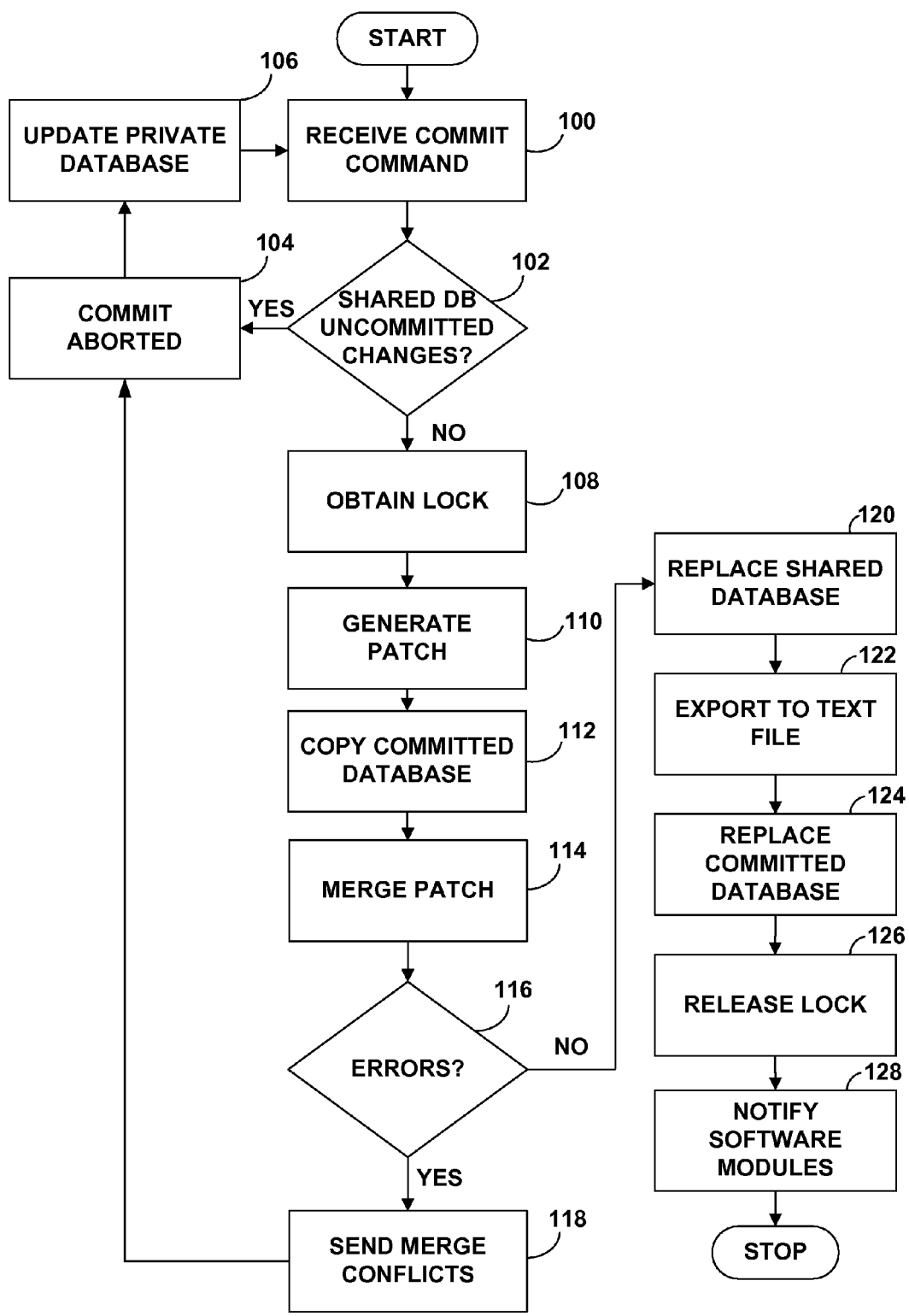
FIG. 7 is a flowchart illustrating a management module updating the configuration of a router in response to a commit command while in a private configuration mode.

FIG. 7 is a flow chart illustrating management module 42 updating the configuration of router 24 in response to a commit command while in a private configuration mode. Management module 42 receives a commit command from client 20 indicates the completion of editing configuration data of private database 52 (100). Management module 42 determines whether shared database 50 contains uncommitted changes (102). When shared database 50 contains uncommitted changes, the commit is aborted (104). Client 20 may wait until shared database 50 is no longer in the process of being edited, and issue an update command. The update command directs management module 42 to merge or compare changes made by client 20 in private database 52 with a copy of the most recent committed database 48 (106). In this manner, the changes made to private database 48 by client 20 are not lost. Alternatively, management module 42 may automatically merge private changes made by client 20 with a copy of the most recent committed database 48 upon aborting a commit. Client 20 may review the changes to ensure correctness, and issue another commit command. Client 20 may also add or remove changes to private database 52 before issuing another commit command. Furthermore, client 20 may issue a rollback command, which discards changes made, and loads private database 52 with a fresh copy of committed database 48.

When shared database 50 does not contain uncommitted changes, management module 42 locks shared database 50 (108). The lock prevents other of clients 20 from editing shared database 50 while manage module 42 is responding to the commit command. Having locked shared database 50, management module 42 may proceed to generate a patch by merging or comparing the changes made to private database 52 with the copy of text file 54, as described above in reference to the show|compare command (110).

Upon generating the configuration patch, management module 42 may make a copy of committed database 48, and apply the patch to the copy of committed database 48 (112, 114). Management module 42 may apply the patch automatically in response to receiving the commit command, or in response to receiving a load patch command.

To apply the configuration patch, management module 42 parses the patch to identify the edit headers describing modified locations. For each header, management module 42 identifies the name of the modified location, and identifies the location within the configuration data being updated. For inserted objects, management module 42 examines any leading or trailing context identifiers specified in the patch to precisely locate a point of insertion. In this manner, management module 42 is able to identify a point within a configuration file or hierarchy for update.

Based on the modification control indicator preceding each object listed within the patch, e.g., a plus sign, minus sign or exclamation point, management module 42 applies the requested changes. If management module 42 detects a plus (+) sign preceding the objects listed within the patch, for example, the module inserts the listed object. Similarly, management module 42 deletes objects that have a proceeding minus (−) sign. After adding or deleting configuration objects, management module 42 processes configuration data associated with the added configuration object. If management module 42 detects an exclamation point (!) preceding the objects listed in the patch, management module 42 reorders the objects accordingly. In this case, however, management module 42 does not process the portion of the configuration data associated with the reordered objects. Instead, management module 42 simply reorders the configuration objects within their container (e.g., list), leaving the underlying configuration data associated with the objects the same.

The general syntax for loading a configuration patch can be expressed as follows:

load patch filename where filename represents a file name storing a configuration patch generated by a show|compare command, as described above. In this manner, the load patch command may direct management module 42 to retrieve the configuration patch from a data file. The following example pseudocode illustrates the exemplary use of the load patch command and the show|compare command.

```
[edit]
user@host # load patch the.patch
load complete
[edit]
user@host # show|compare
[edit system]
- host-name Fred
+ host-name Bob
```

Parts of the configuration data of committed database 48 not specified by the configuration patch remain unchanged. For example, if client 20 only changed the host name in private database 52 (shown in pseudocode above), the copy of committed database 48 would remain unchanged, except for the host name changing from Fred to Bob.

During the application of the patch, management module 42 verifies that the conditions specified by the patch are satisfied. In particular, management module 42 verifies that any specified leading or trailing context identifier is present and has the specified value. In addition, management module 42 verifies that the requested insertion, deletion or reordering of any listed objects is successfully completed. If any conditions fail, management module 42 may abort the application of the configuration patch. For some errors, however, management module 42 may allow the user to proceed, depending up on the severity of the detected error.

In addition, management module 42 may check to see if the copy of committed database 48 with the patch merged, referred to herein as the temporary configuration database, contains any errors (116). Errors may include merging conflicts or configuration data not conforming to schema 56. When the temporary configuration database does contain errors, a merge conflict may be sent to client 20, and the commit is aborted (118, 104). The merge conflict may indicate any errors that occurred in merging committed database 48 with the patch. The merge conflict may also indicate whether the temporary configuration database contains any conforming errors, such as semantic errors. In the case of a merge conflict, management module 42 may automatically update private database 48 to correct the conflict while still retaining any changes made by client 20 (106). Alternatively, client 20 may issue an update command in response to a merge conflict. The pseudocode below illustrates an exemplary use of the update command.

```
user@host>configure private
user@host# set system host-name Bob
user@host# show|compare
[edit system]
- host-name Fred
+ host-name Bob
user@host# commit
'host-name Roy'
statement does not match patch; 'Roy' !='Fred'
load complete (1 errors)
user@host# update
user@host# show|compare
[edit system]
- host-name Roy
+ host-name Bob
```

In the above pseudocode, client 20 issues a configure private command directing management module to operate in a private configuration mode. While in the private configuration mode, client 20 then issues a command to modify the current host name of router 24, i.e., set system host-name, to Bob. Client 20 issues a show|compare command directing management module 42 to generate a patch. Management module 42 generates a patch and may display it to client 20 as shown above. The patch indicates that host name Fred, the current host name of the system in private database 52, is being removed and the host-name Bob is being added. However, upon client 20 issuing a commit command to direct router 24 to verify and accept the change, an indication reveals that an error has occurred. The error states that the current host name of committed database 48 is Roy, not Fred. Another one of clients 20 may have issued a commit changing the host name to from Fred to Roy after client 20 began the configure private session. Client 20 may direct management module 42 to load the changes made by client 20 into a new copy of committed database 48. Alternatively, management module 42 may automatically update private database 52 with a new copy of committed database 38 with changes loaded in. Upon issuing another show|compare command, the patch indicates that the host name will be changed from Roy to Bob.

When the temporary configuration database contains no errors, the configuration data of the temporary configuration database may be applied to the configuration data of shared database 50 (120). The configuration data of the temporary configuration database may further be exported to text file 54 and replaces the current information in text file 54 (122). Furthermore, the configuration data of temporary configuration database may replace the configuration data of committed database 48 (124). The configuration data being replaced in committed database 48 may be saved to allow a client 20 to issue a rollback. Upon completion of replacing configuration data in shared database 50, text file 54, and committed database 48, management module 42 releases the lock on shared database 50 (126).

Management module 42 notifies existing software modules 46 that an updated version of configuration data is located in committed database 48 (128). Software modules 46 retrieve the new configuration information from committed database 48 and router 24 begins to operate in accordance with the updated configuration data.

Figure 8:
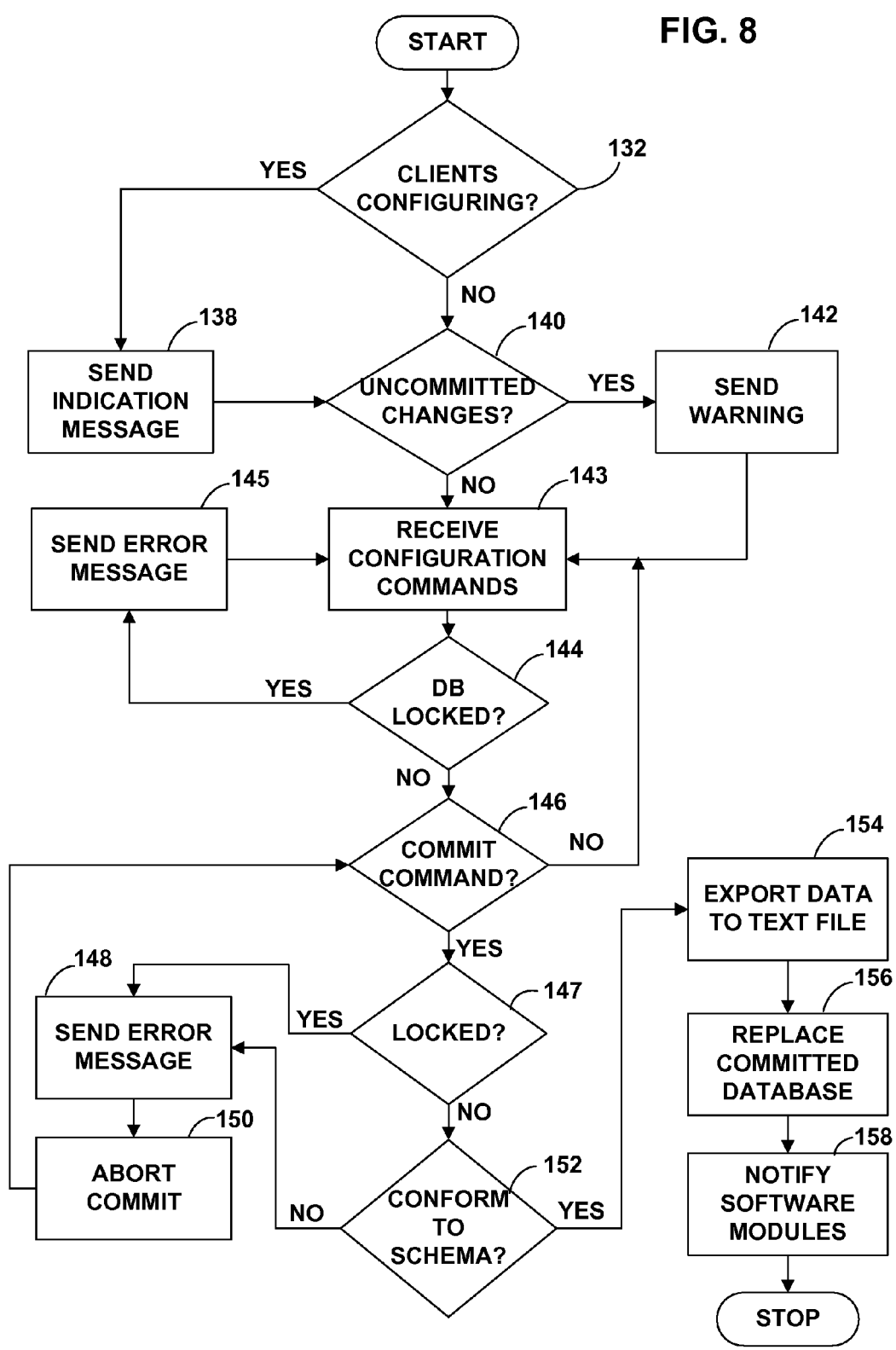
FIG. 8 is a flowchart illustrating a management module operating in a default configure mode in response to receiving a configure command.

FIG. 8 is a flow chart illustrating management module 42 operating in a default configure mode in response to receiving a configure command. In response to receiving a configure command that does not include additional parameters that specify a particular configuration mode, management module 42 determines whether other clients 20 are currently configuring router 24 (132). When other clients 20 are currently configuring router 24, management module 42 indicates to requesting client 20 a message to inform client 20 that there is currently another one of clients 20 configuring router 24 (138). The indication message may further inform client 20 the identity of other clients 20, the portion of configuration data that other clients 20 are viewing or editing, the time that other clients 20 logged into the configuration mode, and the like.

Upon sending the indication message to client 20, or if no other clients 20 are currently configuring router 24, management module 42 validates whether shared database 50 contains uncommitted changes (140). When shared database 50 contains uncommitted changes, a warning is sent to inform client 20 that there are uncommitted changes to shared database 36 (142). For example, the pseudocode below further illustrates these steps.

```
user@host>configure
Current configuration users:
user2 terminal p3 (pid 1088) on since 2002-05-14 01:02:27 CST
```

[edit interfaces so-3/0/0 unit 0 family inet]
The configuration has been changed but not committed
user@host>

In the above pseudocode, client 20 issues a configure command. Management module operates in a default configuration mode since the configure command contains no additional parameters indicating a specific configuration mode. Management module 42 indicates that another one of clients 20 is currently in the default configure mode. In the example above, only one other of clients 20, user2 at terminal p3 (pid 1088), is currently in the default configuration mode. User2 is editing interface so-3/0/0 unit 0 family tnet. Management module 42 further warns client 20 that shared database contains uncommitted changes.

Once in the configure mode, management module 42 receives configuration commands from requesting client 20, and determines whether shared database 50 is locked (143, 144). Shared database 50 may be locked when another of clients 20 is in the exclusive configuration mode or committing changes in the private configuration mode. Requesting client 20 may continue issuing configuration commands as long as shared database 50 remains unlocked. When shared database 50 becomes locked, management module 42 forbids client 20 from issuing configuration commands. When client 20 attempts to issue configuration commands while shared database 50 is locked an error message is sent to client 20 indicating that another of clients 20 currently has a lock on shared database 50 (145). As described above, client 20 may issue a show|compare command that causes management module 42 to generate and display a configuration patch to client 20, thus allowing client 20 to view the changes made to shared database 50. In other words, client 20 may view the differences between shared database 50 and committed database 48.

Upon encountering a commit command (146), management module 42 determines whether any of clients 20 has a lock on shared database 50 (147). When one of clients 20 has a lock on shared database 50, management module 42 will inform client 20 of the lock another client 20 has on shared database 50 (148). The commit command issued by client 20 may be aborted (150). Client 20 may wait until the other client 20 releases the lock on shared database 50, and then issue another commit command. Alternatively, management module 42 may not abort the commit command issued by client, but instead management module may wait for the other client 20 to release the lock on shared database 50, and then proceed with the commit process.

When client 20 issues a commit command, all changes made to the configuration data of shared database 50, complete or incomplete, are committed. Furthermore, client 20 may issue a rollback command. The rollback command discards all the changes made to shared database 50, not just changes made by the issuer of the rollback command.

When shared database 50 is unlocked, management module 42 determines whether the updated configuration conforms to schema 56 (152). When the updated configuration does not conform to schema 56, management module 42 informs client 20 that configuration data does not contain semantically valid data, and aborts the commit command (148, 150). Management module 42 may further indicate where the error occurs in the configuration data. Client 20 may fix the errors and issue another commit command. Alternatively, management module 42 may automatically correct errors to the edited shared database 50. Client 20 may review the automatic error revisions and issue another commit command.

When the updated configuration conforms to schema 56, management module 42 may export the configuration data to text file 54 (154). Furthermore, the updated configuration data may replace the existing configuration data of committed database 48 (156). Management module 42 may save the replaced configuration data in committed database 48 to allow for clients 20 to issue a rollback command. Management module 42 notifies existing software modules 46 of the updated configuration data located in committed database 48 (158). Existing software modules 46 retrieve the updated configuration data from committed database 48 and router 24 begins to operate in accordance with the new configuration data.

Figure 9:
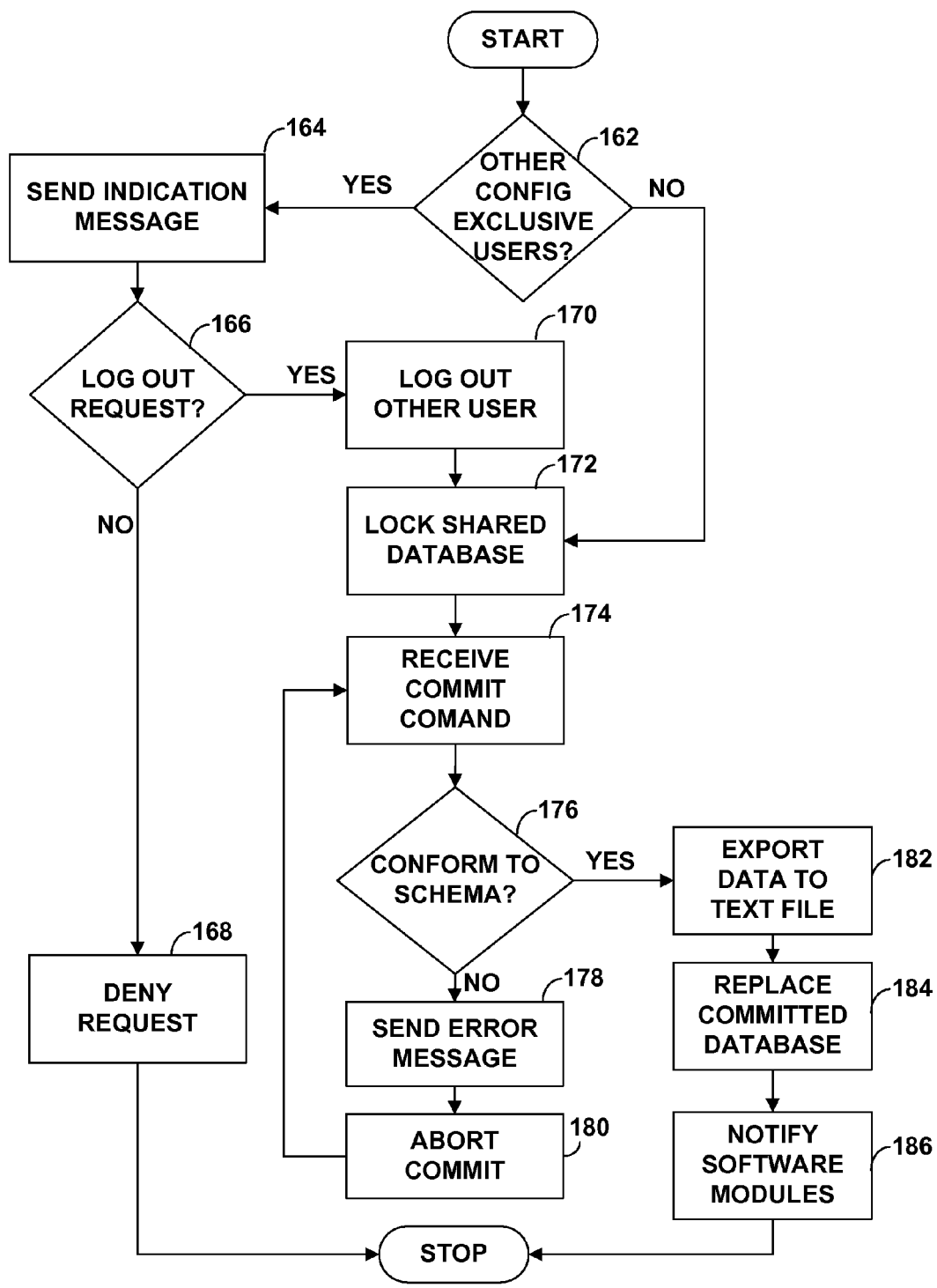
FIG. 9 is a flowchart illustrating a management module operating in an exclusive configure mode in response to receiving a configure exclusive command.

FIG. 9 is a flowchart illustrating management module 42 operating in an exclusive configure mode in response to receiving a configure exclusive command. In response to a configure exclusive command, management module 42 determines whether any clients 20 are currently in an exclusive configuration mode (162). When another one of clients 20 is currently in the exclusive configuration mode, management module 42 informs client 20 that another one of clients 20 is in the exclusive configuration mode (164). Management module 42 may further inform client 20 of the identity of other clients 20, the portion of configuration data that other clients 20 are viewing or editing, the time that other clients 20 logged into the configuration mode, and the like. Client 20 may issue a logout command to forcibly log another one of clients 20 out of the exclusive configuration mode (166). When management module 42 does not receive a logout command, the request of client 20 to configure router 24 in the exclusive configuration mode is denied (168). In this manner, a syntax for the logout command may be expressed as follows:

request system log out [pid], where pid is the process identification of client 20 that is currently in the exclusive configuration mode.

When management module 42 receives a logout command from client 20, management module logs the other of clients 20 out of the exclusive configuration mode (170). After logging other clients 20 out, or if no other clients 20 are in the exclusive configuration mode, management module 42 places a lock on shared database 50 (172). Client 20 may edit the configuration data of shared database 50 without interference from any other of clients 20. As described above, client 20 may issue a show|compare command that causes management module 42 to generate and display a configuration patch to client 20, thus allowing client 20 to view the changes made to shared database 50. In other words, client 20 may view the differences between shared database 50 and committed database 48.

Management module 42 may receive a commit command indicating the completion of editing shared database 50 (174). Management module 42, upon receiving a commit command from client 20, compares the updated configuration to schema 56 (176). When the updated configuration does not conform to schema 56 a management module 42 informs client 20 that there exists errors in the updated configuration, and aborts the commit (178, 180). Management module 42 may further indicate where the errors occur in the configuration information in order for client 20 to correct the errors. Alternatively, management module 42 may automatically correct the errors and display the corrections to client 20.

When the updated configuration conforms to schema 56, management module 42 exports the configuration data to text file 54 (182), and replaces the configuration data of committed database 48 with the updated configuration data (184).

Further, management module 42 may save the configuration data being replaced to allow for a user to issue a rollback command. Management module 42 notifies existing software modules 46 of the updated configuration data in committed database 48 (186). Software modules 46 retrieve the updated configuration data from committed database 48.

The techniques described in this disclosure may be implemented in hardware, software, firmware or any combination thereof. For example, various aspects of the techniques may be implemented within one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

When implemented in software, the functionality ascribed to the systems and devices described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure A number of embodiments of the present invention have been described. Nevertheless, it will be understood that various modifications may be made without departing from the spirit and scope of this disclosure.

The invention claimed is:

1. A method for configuring a network device comprising:
   creating a working copy of an initial data source that stores configuration data for a network device, wherein the working copy includes a set of configuration objects logically arranged in an order, and wherein each of the configuration objects is associated with respective configuration data;
   in response to a reorder command from a client, modifying the working copy to reorder one or more of the configuration objects;
   generating a configuration patch that is a textual representation of any differences between the working copy and the initial data source, wherein the configuration patch includes one or more modification control indicators that identify each of the configuration objects that has been reordered and for which the respective configuration data of the configuration object is unchanged; and
   applying the configuration patch to the initial data source to reorder the identified configuration objects within the initial data source without processing the respective configuration data associated with the configuration objects identified by the modification control indicators.

2. The method of claim 1, wherein the working copy comprises a shared data source editable by a plurality of clients, and modifying the working copy comprises:
   receiving configuration commands from the plurality of clients; and
   modifying the shared data source in response to the configuration commands.

3. The method of claim 1, wherein creating the working copy of the initial data source comprises creating the working copy of the initial data source in response to receiving a command from the client to configure the network device in a private configuration mode, wherein the working copy is a private data source editable by only the requesting client.

4. The method of claim 1, wherein generating the configuration patch comprises generating the configuration patch to include context identifiers that indicate locations within the initial data source for the reordered configuration objects.

5. The method of claim 4, wherein generating the configuration patch comprises generating the configuration patch to include at least one of leading and trailing context identifiers to indicate locations prior to and subsequent to the reordered configuration objects.

6. The method of claim 1, further comprising:
   receiving a command to view any differences between the working copy and the initial data source; and
   generating the configuration patch in response to the command.

7. The method of claim 1, further comprising:
   receiving a commit command from the client directing the network device to apply modifications made in the working copy; and
   generating the configuration patch in response to receiving the commit command from the client.

8. The method of claim 1, wherein the configuration patch further includes one or more modification control indicators that identify configuration objects within the configuration data that are added or deleted, and further comprising:
   applying the configuration patch to the initial data source to add or delete the configuration objects within the initial data source; and
   processing portions of the configuration data associated with the added configuration objects.

9. The method of claim 1, wherein generating a configuration patch comprises:
   creating a temporary copy of the working copy;
   comparing the initial data source to the temporary copy to generate a list of updated configuration objects; and
   generating the configuration patch to list the updated configuration objects.

10. The method of claim 1, further comprising:
    modifying the working copy to update the configuration data associated with one or more of the reordered configuration objects, wherein the configuration patch includes one or more modification control indicators that identify the configuration objects that have been updated; and
    applying the configuration patch to the initial data source to update the configuration data associated with the reordered configuration objects identified by the modification control indicators that identify the configuration objects that have been updated; and
    processing the respective configuration data associated with the updated configuration objects.

11. The method of claim 1, wherein the reorder command is representative of:
    (1) a rearranging of a list of name servers without changing a configuration of the name servers, or
    (2) a rearranging of a list of radius servers without changing a configuration of the radius servers, or
    (3) a rearranging of an order in which rules of two or more filters are applied without changing a configuration of the filters.

12. A network device comprising:
    a hardware-implemented processor;
    an initial data source that stores configuration data for the network device; and
    a management module executing on the processor that generates a configuration patch that is a textual representation of any differences between a working copy of the initial data source and the initial data source, wherein the configuration patch includes one or more modification control indicators that identify configuration objects that have been reordered and for which respective configuration data is unchanged, further wherein the management module applies the configuration patch to the initial data source to reorder the identified configuration objects within the initial data source without processing the respective the configuration data associated with the reordered configuration objects identified by the modification control indicators.

13. The network device of claim 12, wherein:

the one or more modification control indicators that identify configuration objects that have been reordered and for which respective configuration data is unchanged comprise a first patch block, and further comprising a second patch block within the configuration patch that includes one or more modification control indicators that identify configuration objects that have been updated, and the management module applies the second patch block to the initial data source to update the configuration data associated with the updated configuration objects and processes the respective configuration data associated with the updated configuration objects.

14. The network device of claim 11, wherein the working copy comprises a shared data source editable by a plurality of clients.

15. The network device of claim 11, wherein the management module receives a command to configure the network device in a private configuration mode, and creates the working copy as a private data source editable by a single client in response to the command.

16. The network device of claim 11, wherein the management module generates the configuration patch to include context identifiers that indicate locations within the initial data source for the reordered configuration objects.

17. The network device of claim 14, wherein the management module generates the configuration patch to include at least one of leading and trailing context identifiers to indicate locations prior to and subsequent to the reordered configuration objects.

18. The network device of claim 11, wherein the management module receives a command to view any differences between the working copy and the initial data source, and generates the configuration patch in response to the command.

19. The network device of claim 11, wherein the management module receives a command directing the network device to apply the modifications made in the working copy and generates the configuration patch in response to receiving the command.

20. The network device of claim 11, wherein the configuration patch further includes one or more modification control indicators that identify configuration objects that are added or deleted, and further wherein the management module applies the configuration patch to the initial data source to add or delete the configuration objects within the initial data source and processes portions of the configuration data associated with the added configuration objects.

21. The network device of claim 11, wherein the management module creates a temporary copy of the working copy, compares the initial data source to the temporary copy to generate a list of updated configuration objects, and generates the configuration patch to list the updated configuration objects.

22. A non-transitory computer-readable medium comprising instructions that cause a processor to:

create a working copy of an initial data source that stores configuration data for a network device, wherein the working copy comprises a shared data source editable by a plurality of clients, and wherein the working copy includes a set of configuration objects logically arranged in an order, and each of the configuration objects is associated with respective configuration data;

receive configuration commands from the plurality of clients;

modify the working copy to reorder one or more of the configuration objects in response to commands received from the client;

generate a configuration patch that is a textual representation of any differences between the working copy and the initial data source, wherein the configuration patch includes one or more modification control indicators that identify the configuration objects that have been reordered and for which the respective configuration data is unchanged; and apply the configuration patch to the initial data source to reorder the list of configuration objects within the initial data source without processing portions of the configuration data associated with the reordered configuration objects identified by the modification control indicators.

* * * * *